United States Patent
Li et al.

(10) Patent No.: US 11,400,526 B2
(45) Date of Patent: Aug. 2, 2022

(54) CLAMPING JAW ASSEMBLY AND DRILL CHUCK

(71) Applicant: SHANDONG WEIDA MACHINERY CO., LTD., Weihai (CN)

(72) Inventors: Yanzhao Li, Weihai (CN); Ningbo Wei, Weihai (CN)

(73) Assignee: SHANDONG WEIDA MACHINERY CO., LTD., Weihai (CN)

( * ) Notice: Subject to any disclaimer, the term of this patent is extended or adjusted under 35 U.S.C. 154(b) by 99 days.

(21) Appl. No.: 17/044,294

(22) PCT Filed: May 21, 2019

(86) PCT No.: PCT/CN2019/087717
§ 371 (c)(1),
(2) Date: Sep. 30, 2020

(87) PCT Pub. No.: WO2019/223670
PCT Pub. Date: Nov. 28, 2019

(65) Prior Publication Data
US 2021/0154751 A1     May 27, 2021

(30) Foreign Application Priority Data

May 23, 2018 (CN) .......................... 201810503995.1
May 23, 2018 (CN) .......................... 201820778305.9

(51) Int. Cl.
*B23B 31/12*     (2006.01)
*B23B 51/12*     (2006.01)
*B25D 17/08*     (2006.01)

(52) U.S. Cl.
CPC .......... *B23B 51/12* (2013.01); *B23B 31/1238* (2013.01); *B25D 17/088* (2013.01)

(58) Field of Classification Search
CPC ............ B23B 31/1215; B23B 31/1207; B23B 31/1238; B23B 31/16008; B23B 31/1627;
(Continued)

(56) References Cited

U.S. PATENT DOCUMENTS 1,011,975 A * 12/1911 Lewis ................. B23B 31/1253
279/36
1,219,439 A * 3/1917 Church ................... B25B 5/087
279/115
(Continued)

FOREIGN PATENT DOCUMENTS

| CN | 1242727 A | 1/2000 |
| CN | 204672993 U | 9/2015 |
| CN | 105563427 A | 5/2016 |

OTHER PUBLICATIONS

International Search Report issued in corresponding International application No. PCT/CN2019/087717, dated Aug. 20, 2019(9 pages).
(Continued)

*Primary Examiner* — Chwen-Wei Su

(57) ABSTRACT

The present disclosure provides a clamping jaw assembly and a drill chuck, which solve technical problems of complex structure, small clamping range, poor clamping effect, and high cost of the existing clamping jaw assembly. The clamping jaw assembly includes a first clamping jaw and a second clamping jaw, both of which include a screwing section, an outer surface of each screwing section is arranged with a thread, a top end of each screwing section is arranged with a clamping section, the screwing section is fixedly connected with corresponding clamping section. An inner side of the clamping section of the first clamping jaw includes a first clamping part, and an inner side of the clamping section of the second clamping jaw includes a second clamping part matched with the first clamping part. The present disclosure can be widely used in fields of electric tools, machine tool accessories and medical equipment, etc.

5 Claims, 6 Drawing Sheets

(58) Field of Classification Search
CPC ............ B23B 2231/30; B23B 2231/34; B23B 2231/345; B23B 51/12; Y10T 279/17615; Y10T 279/17632; Y10T 279/3431; Y10T 408/953; B25D 17/088
USPC ......................................................... 269/271
See application file for complete search history.

(56) References Cited

U.S. PATENT DOCUMENTS

| | | | | |
|---|---|---|---|---|
| 3,558,146 | A * | 1/1971 | Mayers | ............... B23B 31/1215 |
| | | | | 279/123 |
| 5,816,584 | A * | 10/1998 | Miles | ................. B23B 31/1215 |
| | | | | 279/123 |
| 6,022,029 | A * | 2/2000 | Sakamaki | ........... B23B 31/1269 |
| | | | | 279/123 |
| 6,260,857 | B1 | 7/2001 | Wienhold | |
| 6,427,555 | B2 * | 8/2002 | Mack | ................. B23B 31/1071 |
| | | | | 76/101.1 |
| 6,883,808 | B2 * | 4/2005 | Rohm | ................. B23B 31/1215 |
| | | | | 279/62 |

OTHER PUBLICATIONS

Written Opinion of the International Searching Authority for No. PCT/CN2019/087717.

* cited by examiner

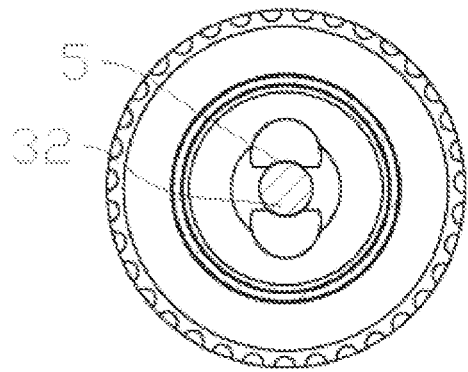
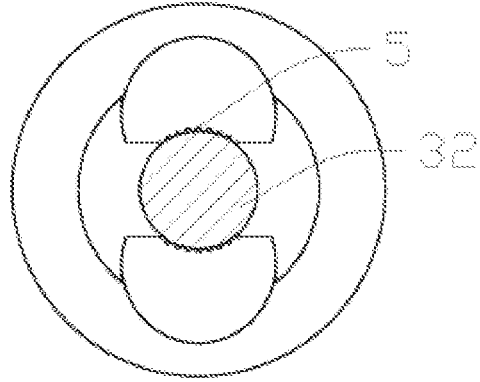
FIG. 5  FIG. 6
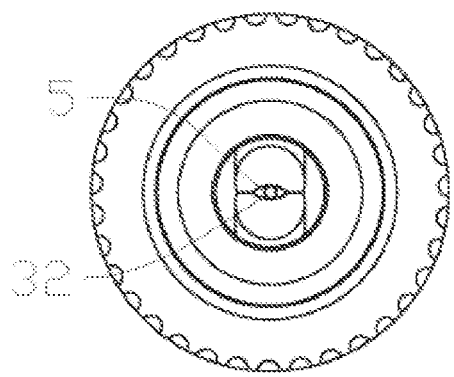
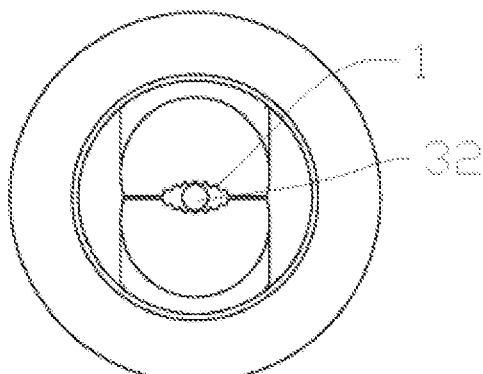
FIG. 7  FIG. 8

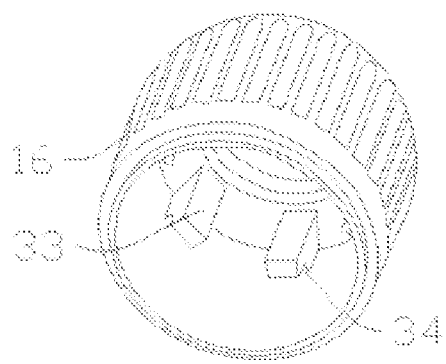
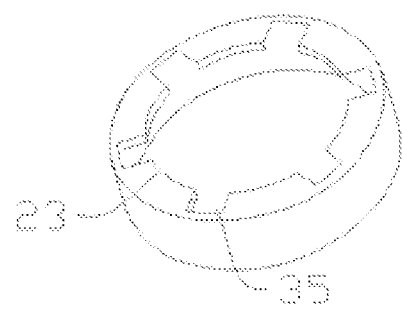
FIG. 20
FIG. 21
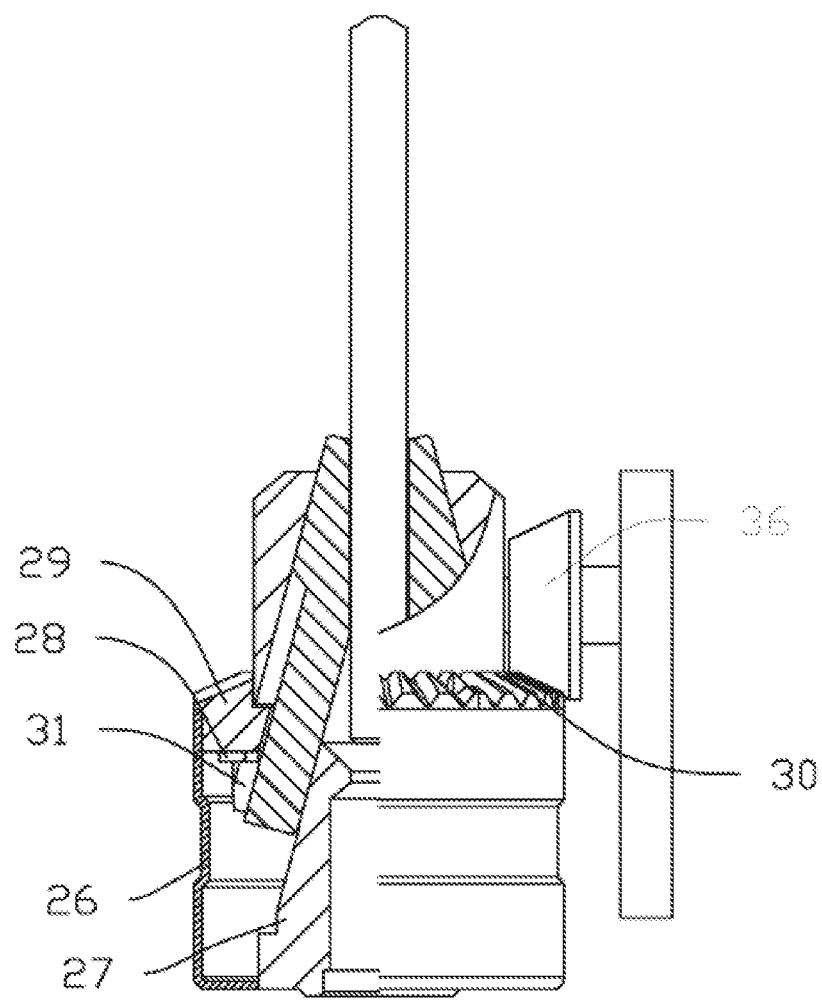
FIG. 22

CLAMPING JAW ASSEMBLY AND DRILL CHUCK

FIELD

The present disclosure relates to a clamping device, in particular to a clamping jaw assembly and a drill chuck.

BACKGROUND

Drill chuck, one of the main accessories in power tool industry and machine tool industry, is widely used in the fields of power tools, machine tool accessories, and medical instruments, etc. It is also an accessory for connecting drilling tool with equipment such as power tool, machine tool and other, and clamping handle tools. The clamping jaw is a clamping tool of the drill chuck.

Existing clamping jaw assembly generally has three jaws, which causing a complicated structure, an inconvenient operation and a waste of material, further causing a high production cost of drill chuck. As the clamping range of the existing clamping jaw assembly is small, its clamping effect is poor. In short, the existing drill chuck is complex and inconvenient to use.

SUMMARY

According to the technical problems of complex structure, small clamping range, poor clamping effect and high cost of the existing clamping jaw assembly, the present disclosure provides a clamping jaw assembly and a drill chuck with advantages of simple structure, large clamping range, good clamping effect and low cost.

Therefore, the present disclosure provides a first clamping jaw and a second clamping jaw, both the first clamping jaw and the second clamping jaw include a screwing section, each screwing section includes a thread arranged at an outer surface of the screwing section, a clamping section is arranged at a top end of each screwing section, the screwing section is fixedly connected with corresponding clamping section, an inner side of the clamping section of the first clamping jaw includes a first clamping part, and an inner side of the clamping section of the second clamping jaw includes a second clamping part matched with the first clamping part.

In some embodiments, the first clamping part and the second clamping part have a same structure; the first clamping part includes grooves arranged on an inner side of the first clamping part along a circumferential direction of the inner side of the first clamping part; and an internal side of a radial cross section of the first clamping part is in a shape of a gear.

In some embodiments, an arc-shaped groove is arranged at a center of the inner side of the first clamping part, symmetrical tooth-like protrusions are respectively arranged at two sides of the arc-shaped groove; an elongated groove is arranged at a center of an inner side of the second clamping part, the elongated groove is rectangular, a side wall of the elongated groove is perpendicular to a bottom wall, two sides of the elongated groove are both provided with a smooth part, the smooth parts are perpendicular to the side walls of the elongated groove; and clasping parts are arranged at two sides of the smooth part.

The present disclosure further provides a drill chuck which includes a front sleeve, a back sleeve, and the clamping jaw assembly, the front sleeve is positioned above the back sleeve, a first drill body is arranged in the front sleeve and the back sleeve, a lower end of the first drill body is fixedly connected with the back sleeve, an upper end of the first drill body is in interference connection with a front cover, an inner side of an upper end of the front sleeve is provided with a limit step arranged along a circumferential direction of the upper end of the front sleeve, a side wall of the first drill body is provided with two symmetrical clamping jaw holes, and the clamping jaw assembly is positioned in the clamping jaw holes; and a middle part of the first drill body is provided with a first support step, an upper end of the first support step is provided with a first gasket, the first gasket is sleeved on an outer circumferential surface of the first drill body and is in clearance fit with the first drill body, an upper end of the first gasket is provided with a nut fixedly connected with a nut sleeve, the nut sleeve is connected with the front sleeve, the nut and the nut sleeve are sleeved on the outer circumferential surface of the first drill body and are in clearance fit with the first drill body, and an inner side of the nut is provided with a thread.

In some embodiments, a bearing is arranged between the first gasket and the nut, and the bearing is sleeved on the outer circumferential surface of the first drill body and is in clearance fit with the first drill body.

In some embodiments, driving jaws are uniformly arranged at the upper end of the inner side of the front sleeve, the driving jaws are rectangular; a notch is arranged at a side of a lower end of the driving jaw near the inner wall of the front sleeve; and the nut sleeve includes driving holes matched with the driving jaws.

The present disclosure further provides another drill chuck which includes an outer sleeve and the clamping jaw assembly, a bevel gear is fixedly arranged at an upper end of the outer sleeve; a second drill body is arranged in the outer sleeve and the bevel gear, a lower end of the second drill body is in clearance fit with a lower end of the outer sleeve, an upper end of the second drill body is configured to penetrate through the bevel gear and is in clearance fit with the bevel gear, a side wall of the second drill body is provided with two symmetrical clamping jaw holes, and the clamping jaw assembly is positioned in the clamping jaw holes; and a middle part of the second drill body is provided with a second support step, an upper end of the second support step is provided with a second gasket, an upper end of the second gasket is provided with a toothed nut; and the toothed nut is fixedly connected with the outer sleeve, and an inner side of the toothed nut is provided with a thread.

The clamping jaw assembly of the present disclosure has simple structure and low cost. The first clamping part and the second clamping part of the clamping jaw assembly have a same structure, the inner side of the first clamping part has a plurality of grooves arranged along its circumferential direction, and the internal side of the radial cross section of the first clamping part is in the shape of gear. When the first clamping part and the second clamping part are clamped with the drilling tool, it can ensure that the first clamping part and the second clamping part have at least four linear contacts with the drilling tool. Compared with the clamping jaw with an arc-shaped inner surface, the clamping jaw of the present disclosure has a wide clamping range and a good clamping effect. When the center of the inner side of the first clamping part has an arc-shaped groove, symmetrical tooth-like protrusions are arranged on two sides of the arc-shaped groove. The center of the inner side of the second clamping part has an elongated groove, smooth parts are arranged on two sides of the elongated groove, and clasping parts are arranged on two sides of the smooth part. When the first clamping part and the second clamping part are clamped with the drilling tool, it can ensure that the first clamping part and the second clamping part have at least three linear contacts with the drilling tool. As such, the clamping jaw of the present disclosure has a wide clamping range and a good clamping effect.

BRIEF DESCRIPTION OF THE DRAWINGS

FIG. 5 is a schematic top view of the first clamping jaw assembly in the second clamping state according to the first embodiment of the present disclosure;

FIG. 6 is an enlarged, top view of the first clamping jaw assembly in the second clamping state according to the first embodiment of the present disclosure;

FIG. 7 is a schematic top view of the first clamping jaw assembly in the third clamping state according to the first embodiment of the present disclosure;

FIG. 8 is an enlarged, top view of the first clamping jaw assembly in the third clamping state according to the first embodiment of the present disclosure;

FIG. 20 is a schematic structural diagram of a front sleeve according to the third embodiment of the present disclosure;

FIG. 21 is a schematic structural diagram of a nut sleeve according to the third embodiment of the present disclosure; and FIG. 22 is a semi-sectional structural diagram of the clamping jaw assembly according to the third embodiment of the present disclosure.

Explanation of labels in the figures:

1. First clamping jaw; 2. Second clamping jaw; 3. Screwing section; 4. Clamping section; 5. Clamping part; 6. Third clamping jaw; 7. Fourth clamping jaw; 8. Third screwing section; 9. Third clamping section; 10. Fourth clamping section; 11. Elongated groove; 12. Smooth part; 13. Clasping part; 14. Arc-shaped groove; 15. Tooth-like protrusion; 16. Front sleeve; 17. Back sleeve; 18. First drill body; 19. First support step; 20. First gasket; 21. Bearing; 22. Nut; 23. Nut sleeve; 24. Fourth screwing section; 25. Front cover; 26. Outer sleeve; 27. Second drill body; 28. Second gasket; 29. Toothed nut; 30. Bevel gear; 31. Second support step; 32. Drilling tool; 33. Driving jaw; 34. Notch; 35. Driving hole; 36. Key; 37. Limit step.

DETAILED DESCRIPTION OF THE EMBODIMENTS

Hereinafter, specific embodiments of the present disclosure will be described in detail with reference to the drawings.

Embodiment 1

Figure 1:
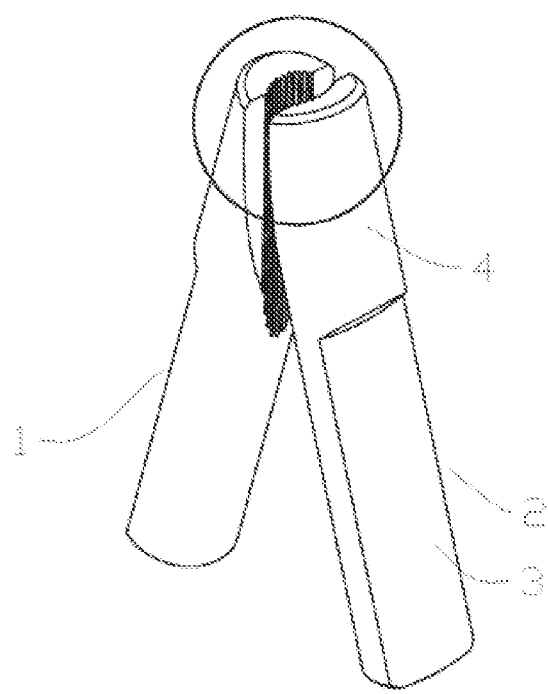
FIG. 1 is a structural schematic diagram of a clamping jaw assembly according to the first embodiment of the present disclosure.
Figure 2:
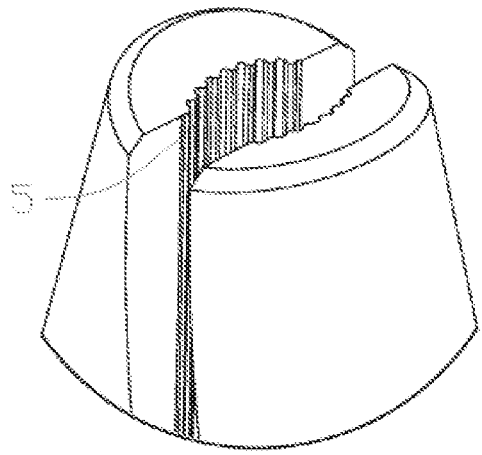
FIG. 2 is an enlarged structural diagram of the clamping part of the first clamping jaw assembly according to the first embodiment of the present disclosure.

As shown in FIG. 1 and FIG. 2, in this embodiment, a first clamping jaw assembly is included. The first clamping jaw assembly has a first clamping jaw 1 and a second clamping jaw 2, and the first clamping jaw 1 and the second clamping jaw 2 have a same structure. In the working state, the first clamping jaw 1 and the second clamping jaw 2 are arranged opposite to each other, in a shape of " ⋀ ". The first clamping jaw 1 and the second clamping jaw 2 are both provided with a screwing section 3, and an outer side of each screwing section 3 is provided with a thread. A clamping section 4 is arranged on an upper end of each screwing section 3. The screwing section 3 is fixedly connected with corresponding clamping section 4. The screwing section 3 and the clamping section 4 can be welded or integrally formed. A clamping part 5 is arranged at the inner side of each clamping section 4.

The inner side of the clamping part 5 is provided with a plurality of grooves along a circumferential direction of an inner side of the clamping part 5. And, an internal side of the radial cross section of the clamping part 5 is in a shape of a gear;

Compared with the traditional clamping jaw assembly with three jaws, the first clamping jaw assembly of this embodiment tightly clamps the drilling tool 32 through the first clamping jaw 1 and the second jaw 2, thus saving more materials and processing costs.

Figure 3:
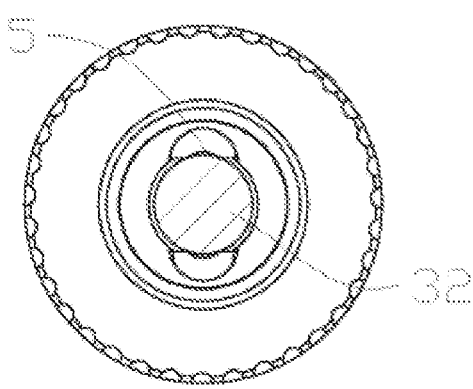
FIG. 3 is a schematic top view of the first clamping jaw assembly in the first clamping state according to the first embodiment of the present disclosure.
Figure 4:
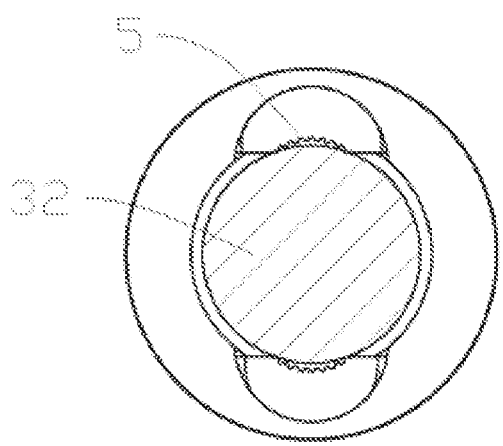
FIG. 4 is an enlarged, top view of the first clamping jaw assembly in the first clamping state according to the first embodiment of the present disclosure.

As shown in FIGS. 3 and 4, when the first clamping jaw 1 and the second clamping jaw 2 are in the first clamping state, the two clamping parts 5 form two linear contacts with the drilling tool 32, respectively.

As shown in 5 and 6, when the first clamping jaw 1 and the second clamping jaw 2 are in the clamping state 2, the two clamping parts 5 form at least two linear contacts with the drilling tool 32, respectively.

As shown in FIGS. 7 and 8, when the first clamping jaw 1 and the second clamping jaw 2 are in the third clamping state, the two clamping parts 5 form two linear contacts with the drilling tool 32, respectively.

It can he seen that when the two clamping parts 5 are clamped with the drilling tool 32, it can be ensured that the two clamping parts 5 at least has four linear contacts with the drilling tool 32. Compared with the clamping jaw with arc-shaped inner circumferential surface or other shaped inner circumferential surface, the first clamping jaw assembly has a wide clamping range and a good clamping effect.

Embodiment 2

Figure 9:
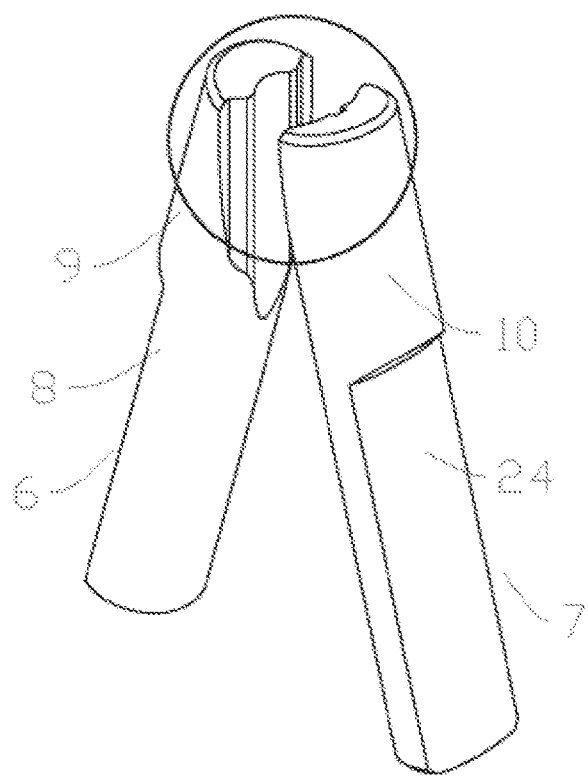
FIG. 9 is a structural schematic diagram of a clamping jaw assembly according to the second embodiment of the present disclosure.
Figure 11:
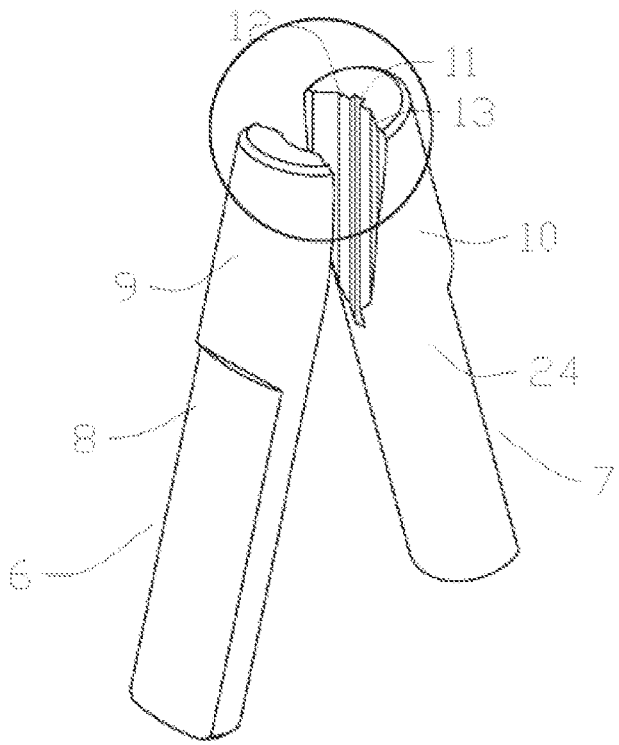
FIG. 11 is another structural schematic diagram of the clamping jaw assembly according to the second embodiment of the present disclosure.

As shown in FIGS. 9 and 11, in this embodiment, a second clamping jaw assembly is included. The second clamping jaw assembly has a third clamping jaw 6 and a fourth clamping jaw 7. In the working state, the third clamping jaw 6 and the fourth clamping jaw 7 are arranged opposite to each other, in a shape of " ⋏ ".

Figure 10:
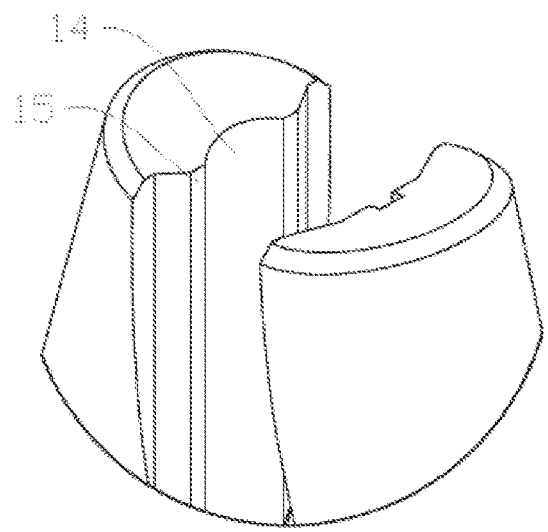
FIG. 10 is an enlarged structural diagram of the clamping part of the second clamping jaw assembly according to the second embodiment of the present disclosure.

As shown in FIGS. 9 and 10, the third clamping jaw 6 is provided with a third screwing section 8, and an outer side of the third screwing section 8 is provided with a thread; an upper end of the third screwing section 8 is provided with a third clamping section 9, the third screwing section 8 is fixedly connected with the third clamping section 9. A third clamping part is arranged at an inner side of each third clamping section 9. An arc-shaped groove 14 is arranged at a center of the inner side of the third clamping part. Symmetrical tooth-like protrusions 15 are arranged at two sides of the arc-shaped groove 14.

Figure 12:
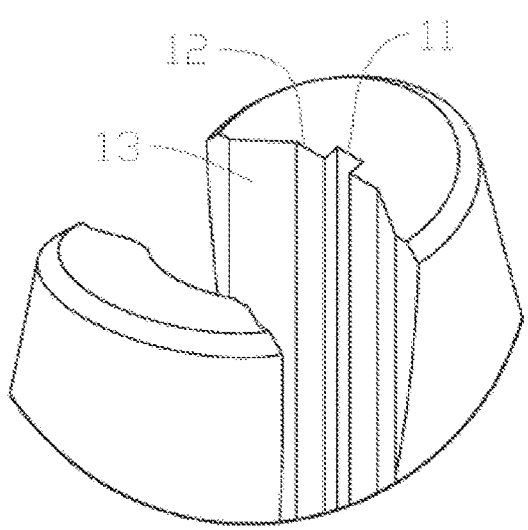
FIG. 12 is another enlarged structural diagram of the clamping part of the second clamping jaw assembly according to the second embodiment of the present disclosure.

As shown in FIG. 11 and FIG. 12, the fourth clamping jaw 7 is provided with a fourth screwing section 24, which has the same structure as the third screwing section 8, outer sides of the fourth screwing section 24 and the third screwing section 8 are both provided with threads. An upper end of the fourth screwing section 24 is provided with a fourth clamping section 10. The fourth screwing section 24 is fixedly connected with the fourth clamping section 10. The inner side of the fourth clamping section 10 is provided with a fourth clamping part, and a center of an inner side of the fourth clamping part is provided with an elongated groove 11 which is rectangular. A side wall of the fourth clamping part is perpendicular to a bottom wall of the fourth clamping part. Two sides of the elongated groove 11 are provided with smooth parts 12 which are perpendicular to the side walls of the elongated groove 11. Two sides of the smooth part 12 are provided with clasping parts 13.

Figure 13:
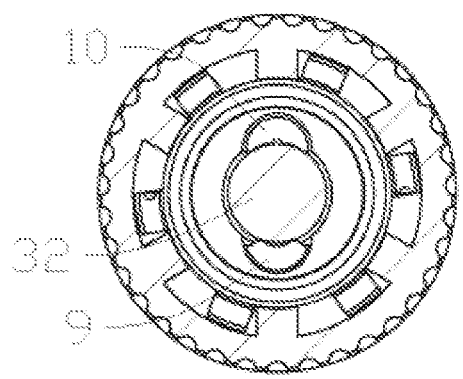
FIG. 13 is a schematic top view of the second clamping jaw assembly in the first clamping state according to the second embodiment of the present disclosure.
Figure 14:
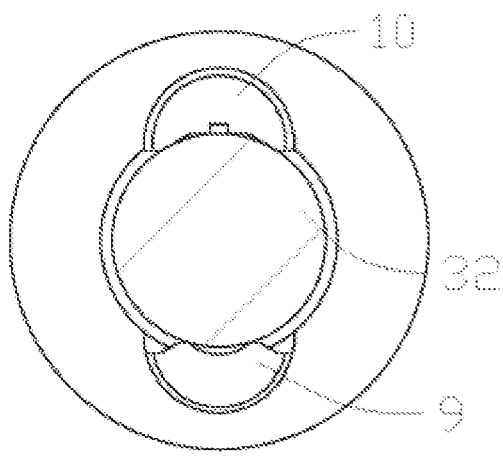
FIG. 14 is an enlarged, top view of the second clamping jaw assembly in the first clamping state according to the second embodiment of the present disclosure.

As shown in FIG. 13 and FIG. 14, when the third clamping jaw 6 and the fourth clamping jaw 7 are in the first clamping state, the drilling tool 32 has two linear contacts with the tooth-like protrusion 15 of the third clamping part, and has two linear contacts with the clasping part 13 of the fourth clamping part.

Figure 15:
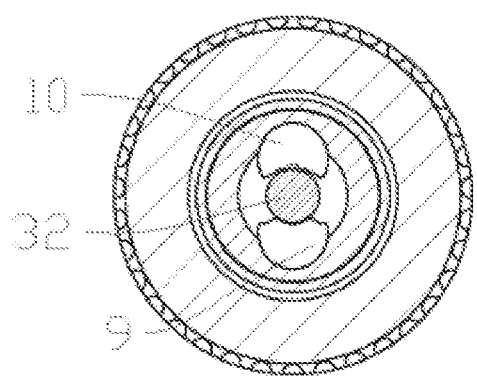
FIG. 15 is a schematic top view of the second clamping jaw assembly in the second clamping state according to the second embodiment of the present disclosure.
Figure 16:
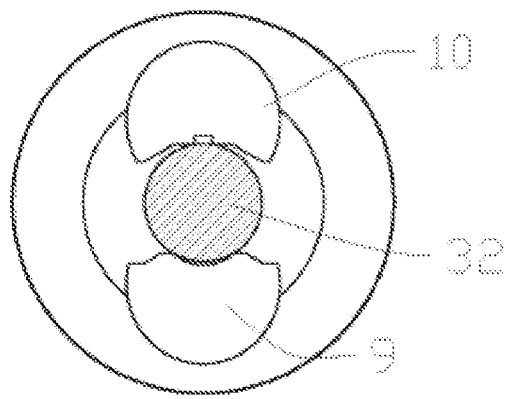
FIG. 16 is an enlarged, top view of the second clamping jaw assembly in the second clamping state according to the second embodiment of the present disclosure.

As shown in FIG. 15 and FIG. 16, when the third clamping jaw 6 and the fourth clamping jaw 7 are in the second clamping state, the drilling tool 32 has two linear contacts with the tooth-like protrusion 15 of the third clamping part, and has two linear contacts with the elongated groove 11 of the fourth clamping part.

Figure 17:
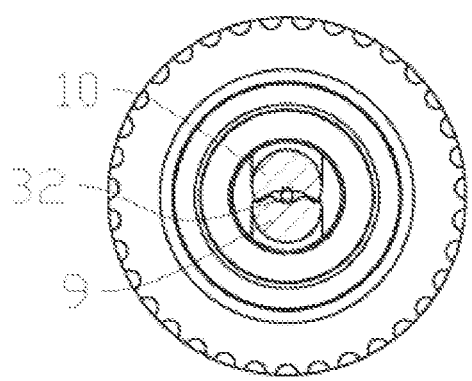
FIG. 17 is a schematic top view of the second clamping jaw assembly in the third clamping state according to the second embodiment of the present disclosure.
Figure 18:
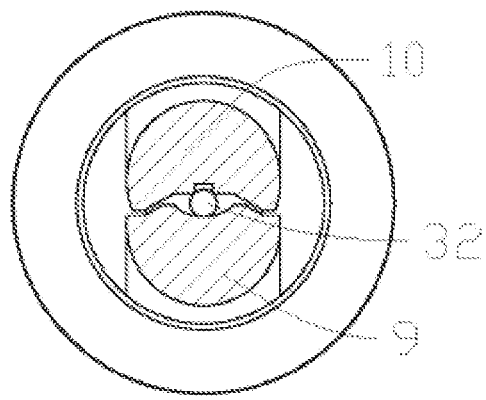
FIG. 18 is an enlarged, top view of the second clamping jaw assembly in the third clamping state according to the second embodiment of the present disclosure.

As shown in FIG. 17 and FIG. 18, when the third clamping jaw 6 and the fourth clamping jaw 7 are in the third clamping state, the drilling tool has one linear contact with the arc-shaped groove 14 of the third clamping part, and has two linear contacts with the elongated groove 11 of the fourth clamping part.

It can be seen that when the second clamping jaw assembly clamps drilling tools 32 of different sizes, the second clamping jaw assembly has at least three linear contacts with the drilling tools 32. As such, the second clamping jaw assembly has a wide clamping range and a good clamping effect.

Embodiment 3

Figure 19:
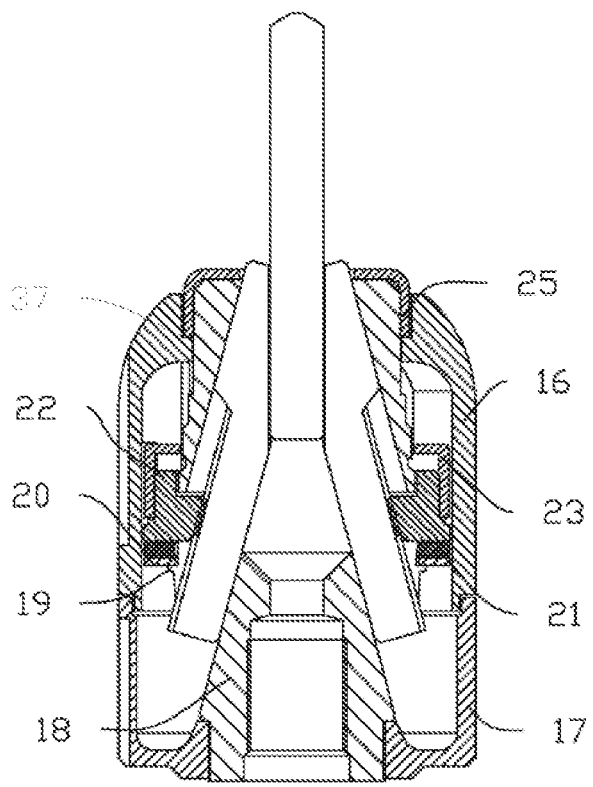
FIG. 19 is a sectional structural diagram of the clamping jaw assembly according to the third embodiment of the present disclosure.

As shown in FIG. 19, in this embodiment, a drill chuck is included. The drill chuck has a front sleeve 16 and a back sleeve 17. The front sleeve 16 is positioned above the back sleeve 17. A first drill body 18 is arranged in the front sleeve 16 and the back sleeve 17, and a lower end of the first drill body 18 is fixedly connected with the back sleeve 17. An upper end of the first drill body 18 is in interference connection with a front cover 25. An inner side of an upper end of the front sleeve 16 is provided with a limit step 37 arranged along a circumferential direction of the upper end of the front sleeve 16. The limit step 37 is matched with the front cover 25 to prevent the front sleeve 16 from falling out of the upper end of the first drill body 18. Two symmetrical clamping jaw holes are arranged at two side walls of the first drill body 18 respectively. The clamping jaw assembly is arranged in the clamping jaw holes. The clamping jaw assembly passes through the clamping jaw holes and enters the inner side of the first drill body 18 from the outside of the first drill body 18. The clamping jaw assembly can be the first clamping jaw assembly in the first embodiment or the second clamping jaw assembly in the second embodiment.

A first support step 19 is arranged in a center of the first drill body 18, and a first gasket 20 is arranged at an upper end of the first support step 19, which is sleeved on an outer circumferential surface of the first drill body 18 and is in clearance fit with the first drill body 18. An upper end of the first gasket 20 is provided with a bearing 21, the bearing 21 is sleeved on the outer circumferential surface of the first drill body 18 and is in clearance fit with the first drill body 18. The upper end of the bearing 21 is provided with a two-lobed nut 22. The nut 22 is fixedly connected with a nut sleeve 23 which is connected with the front sleeve 16. The nut 22 and the nut sleeve 23 are sleeved on the outer circumferential surface of the first drill body 18 and are in clearance fit with the first drill body 18. An inner side of the nut 22 is provided with a thread matched with the screwing section 3 in the first embodiment or the third screwing section 8 in the second embodiment.

The bearing 21 is installed between the first gasket 20 and the nut 22, which can reduce the sliding friction between the nut 22 and the first gasket 20 through rolling friction, thereby improving torque input and reducing torque loss.

When the drilling tool is fixed with the drill chuck, the back sleeve 17 can be fixed, and the front sleeve 16 can be rotated, and the front sleeve 16 can drive the nut sleeve 23 to rotate, and the nut sleeve 23 can drive the nut 22 to rotate. When the drill chuck is cooperated with the first clamping jaw assembly according to the first embodiment, the thread at the inner side of the nut 22 are matched with the first clamping jaw 1 and the second clamping jaw 2, the first clamping jaw 1 move upwards through thread transmission. The first clamping jaw 1 and the second clamping jaw 2 move simultaneously to tightly clamp the drilling tool 32.

When the drill chuck is cooperated with the second clamping jaw assembly according to the second embodiment, the thread at the inner side of the nut 22 are matched with the third clamping jaw 6 and the fourth clamping jaw 7, and the second clamping jaw assembly moves upwards through thread transmission, and the third clamping jaw 6 and the fourth clamping jaw 7 move simultaneously to tightly clamp the drilling tool 32.

The rear end of the first drill body 18 of the drill chuck is connected with the electric tool and other equipment through thread, taper hole or other connection mode, and the electric tool and other equipment drive power to the drill chuck to drive the drilling tools to work.

As shown in FIGS. 20 and 21, in this embodiment, a plurality of driving jaws 33 are uniformly arranged at the upper end of the inner side of the front sleeve 16. The driving jaws 33 are rectangular. A notch 34 is arranged at the lower end of each driving jaw 33 near the inner wall of the front sleeve 16. The nut sleeve 23 is provided with driving holes 35 matched with the driving jaws 33, and the driving jaws 33 in the front sleeve 16 are inserted into the corresponding driving holes 35 of the nut sleeve 23, so that the nut sleeve 23 and the front sleeve 16 are integrated, and the nut sleeve 23 and the front sleeve 16 rotate together to avoid relative sliding between the nut sleeve 23 and the front sleeve 16 during rotation.

Embodiment 4

The present disclosure is provided with an outer sleeve 26, and an upper end of the outer sleeve 26 is fixedly provided with a bevel gear 30. A second drill body 27 is arranged in the outer sleeve 26 and the bevel gear 30. A lower end of the second drill body 27 is in clearance fit with the lower end of the outer sleeve 26, and an upper end of the second drill body 27 penetrates through the bevel gear 30 and is in clearance fit with the bevel gear 30. A side wall of the second drill body 27 is provided with two symmetrical clamping jaw holes. The clamping jaw assembly is arranged in the clamping jaw holes, and the clamping jaw assembly passes through the clamping jaw holes and enters the inner side of the second drilling body 27 from the outside of the second drilling body 27. The clamping jaw assembly can be the first clamping jaw assembly in the first embodiment or the second clamping jaw assembly in the second embodiment.

A center of the second drill body 27 is provided with a second support step 31. An upper end of the second support step 31 is provided with a second gasket 28. An upper end of the second gasket 28 is provided with a toothed nut 29 which is fixedly connected with the outer sleeve 26. The inner side of the toothed nut 29 is provided with threads matched with the screwing section 3 in the first embodiment or the third screwing section 8 in the second embodiment.

When the drill chuck fixes the drilling tool, the key 36 is adopted to rotate the bevel gear 30, the bevel gear 30 drives the outer sleeve 26 and the toothed nut 29 to rotate together. The toothed nut 29 is matched with the first clamping jaw assembly or the second clamping jaw assembly, so that the first clamping jaw assembly or the second clamping jaw assembly clamps the drilling tool tightly.

However, the described above are only specific embodiments of the present disclosure and cannot be used to limit the scope of implementation of the present disclosure. Therefore, replacement of equivalent components, or equivalent changes and modifications made in accordance with the scope of the patent protection of the present disclosure shall fall within the scope of the claims of the present disclosure.

What is claimed is:

1. A clamping jaw assembly, comprising a first clamping jaw, the clamping jaw assembly further comprises a second clamping jaw, both the first clamping jaw and the second clamping jaw comprising a screwing section, each screwing section comprising a thread arranged at an outer surface of the screwing section, a clamping section being arranged at a top end of each screwing section, the screwing section being fixedly connected with corresponding clamping section, an inner side of the clamping section of the first clamping jaw comprising a first clamping part, and an inner side of the clamping section of the second clamping jaw comprising a second clamping part matched with the first clamping part, wherein
an arc-shaped groove is arranged at a center of an inner side of the first clamping part; symmetrical tooth-like protrusions being respectively arranged at two sides of the arc-shaped groove;
an elongated groove is arranged at a center of an inner side of the second clamping part, the elongated groove being rectangular, a side wall of the elongated groove being perpendicular to a bottom wall;
two sides of the elongated groove are both provided with a smooth part, the smooth parts being perpendicular to the side walls of the elongated groove;
and clasping parts are arranged at two sides of the smooth part.

2. A drill chuck, wherein the drill chuck comprises a front sleeve, a back sleeve, and a clamping jaw assembly according to claim 1, the front sleeve being positioned above the back sleeve, a first drill body being arranged in the front sleeve and the back sleeve, a lower end of the first drill body being fixedly connected with the back sleeve, an upper end of the first drill body being in interference connection with a front cover, an inner side of an upper end of the front sleeve being provided with a limit step arranged along a circumferential direction of the upper end, a side wall of the first drill body being provided with two symmetrical clamping jaw holes, and the clamping jaw assembly being positioned in the clamping jaw holes; and a middle part of the first drill body is provided with a first support step, an upper end of the first support step being provided with a first gasket, the first gasket being sleeved on an outer circumferential surface of the first drill body and being in clearance fit with the first drill body, an upper end of the first gasket being provided with a nut fixedly connected with a nut sleeve, the nut sleeve being connected with the front sleeve, the nut and the nut sleeve being sleeved on the outer circumferential surface of the first drill body and being in clearance fit with the first drill body, and an inner side of the nut being provided with a thread.

3. The drill chuck according to claim 2, wherein a bearing is arranged between the first gasket and the nut, and the bearing being sleeved on the outer circumferential surface of the first drill body and being in clearance fit with the first drill body.

4. The dill chuck according to claim 2, wherein
driving jaws are uniformly arranged at the upper end of the inner side of the front sleeve, the driving jaws being rectangular;
a notch is arranged at a side of the lower end of the driving jaw near the inner wall of the front sleeve;
and the nut sleeve comprises driving holes matched with the driving jaws.

5. A drill chuck, wherein the drill chuck comprises an outer sleeve and a clamping jaw assembly according to claim 1, a bevel gear being fixedly arranged at an upper end of the outer sleeve; a second drill body is arranged in the outer sleeve and the bevel gear, a lower end of the second drill body being in clearance fit with a lower end of the outer sleeve, an upper end of the second drill body being configured to penetrate through the bevel gear and being in clearance fit with the bevel gear, a side wall of the second drill body being provided with two symmetrical clamping jaw holes, and the clamping jaw assembly being positioned in the clamping jaw holes; and a middle part of the second drill body is provided with a second support step, an upper end of the second support step being provided with a second gasket, an upper end of the second gasket being provided with a toothed nut; and the toothed nut is fixedly connected with the outer sleeve, and an inner side of the toothed nut being provided with a thread.

* * * * *